United States Patent [19]
McKinney et al.

[11] 3,762,681
[45] Oct. 2, 1973

[54] FLUID FLOW CONTROL DEVICE WITH BAFFLES

[75] Inventors: Richard W. McKinney; Jay R. Katchka; Fred W. Hendrick, all of Long Beach, Calif.

[73] Assignee: Robertshaw Controls Company, Richmond, Va.

[22] Filed: Sept. 28, 1971

[21] Appl. No.: 184,388

[52] U.S. Cl.................. 251/61.1, 137/510, 251/331
[51] Int. Cl............................................. F16k 7/17
[58] Field of Search................ 251/61.1, 61.4, 61.5, 251/331; 137/510

[56] References Cited
UNITED STATES PATENTS

| | | | |
|---|---|---|---|
| 3,426,798 | 2/1969 | Cheruak | 251/331 X |
| 3,078,066 | 2/1963 | Moore | 251/61.5 X |
| 2,487,501 | 11/1949 | Williams | 251/61.1 X |
| 3,468,511 | 9/1969 | Haskius | 251/61.1 |
| 3,275,011 | 9/1966 | Berezansky | 251/331 X |

*Primary Examiner*—Harold W. Weakley
*Attorney*—Brenner, O'Brien and Guay

[57] ABSTRACT

A fluid flow control device of the flexible diaphragm valve type includes a plurality of baffles mounted on the surface of the diaphragm facing the valve seat and extending radially from the centerpoint of the diaphragm. The disclosed fluid flow control device has a reduced pressure drop and greater capacity.

1 Claim, 5 Drawing Figures

PATENTED OCT 2 1973 3,762,681
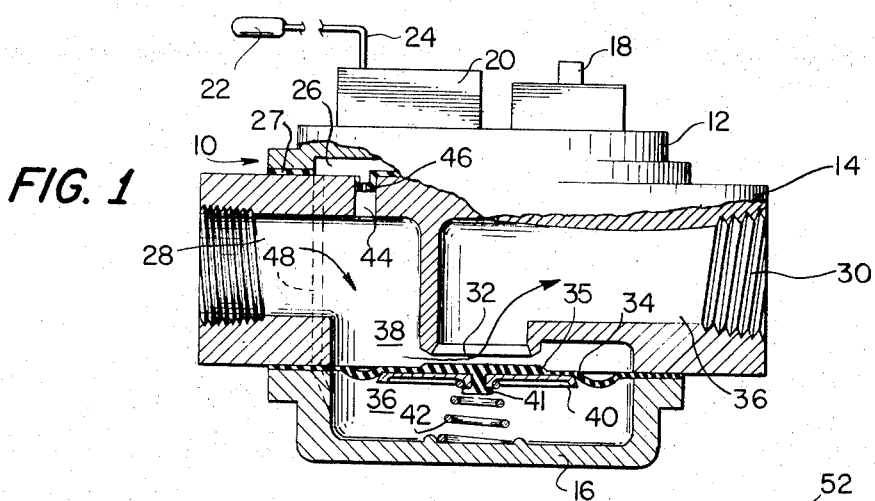
FIG. 1
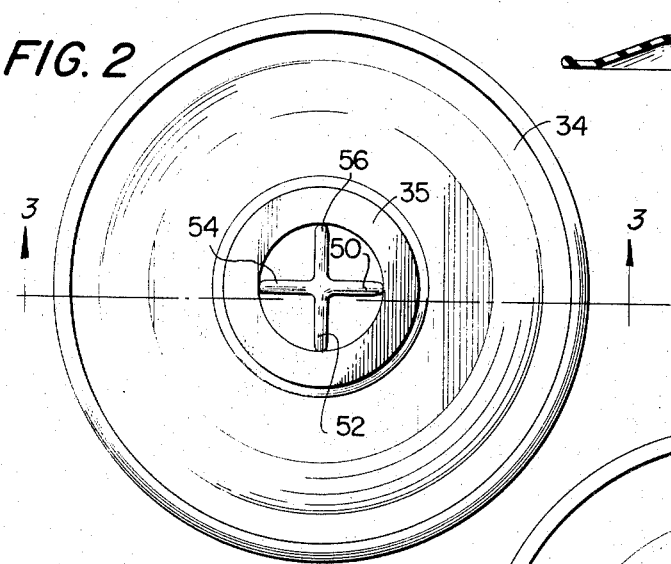
FIG. 2
FIG. 3
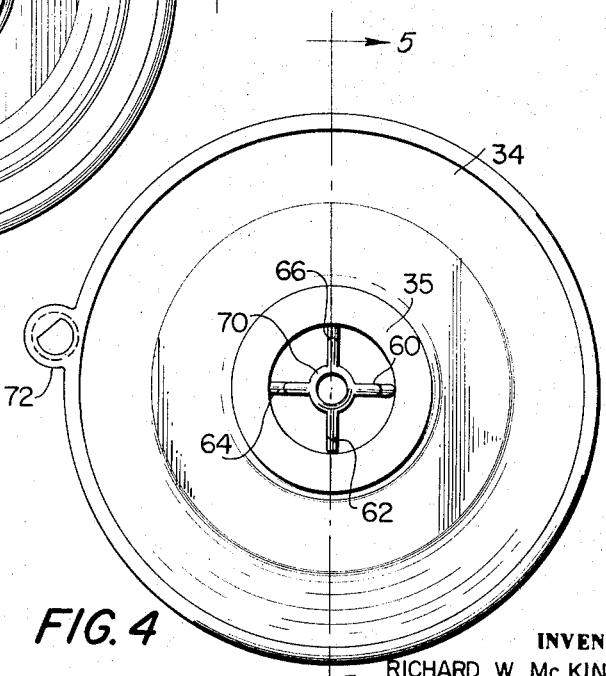
FIG. 5
FIG. 4
INVENTORS
RICHARD W. McKINNEY
JAY R. KATCHKA
FRED W. HENDRICK

FLUID FLOW CONTROL DEVICE WITH BAFFLES

BACKGROUND OF THE INVENTION

1. Field of the Invention

This invention relates generally to fluid flow control devices, such as pressure regulators, and more particularly to flexible diaphragm valves for regulating main gas pressure to fuel burners.

2. Description of the Prior Art

Various designs for diaphragm valves have been suggested in the prior art for the purpose of reducing the pressure drop across such valves. This is due to the fact that a design which produces a higher pressure drop across the valve results in a reduced fluid flow through such a valve or alternatively requires a higher inlet pressure for a given fluid flow. Expressed in another way, the capacity of such a valve is reduced by a relatively high pressure drop. Examples of valves of the prior art are disclosed in U.S. Pat. Nos. 1,964,921; 2,211,212; 2,307,066; 2,394,911; 3,282,556; 3,468,511 and 3,502,300.

SUMMARY OF THE INVENTION

The present invention is embodied in a fluid flow control device which includes the combination of a valve casing having inlet means and outlet means and an annular valve seat therebetween having a predetermined radius from its centerpoint, a valve face adapted to cooperate with the annular valve seat, and several baffles or vanes fixedly mounted on the surface of the valve face and extending radially from a point on the valve face corresponding generally to the centerpoint of the annular valve seat, the terminal portion of each of the baffles extending a distance less than the radius of the annular valve seat.

An object of the present invention is to provide a flexible diaphragm valve having a reduced pressure drop between its inlet and outlet.

A further object of the present invention is to provide a flexible diaphragm valve having increased capacity and providing greater fluid flow for a given inlet pressure.

Other objects and advantages of the present invention will become apparent from the following description taken in conjunction with the accompanying drawing.

BRIEF DESCRIPTION OF THE DRAWING

FIG. 1 is a schematic diagram with parts in section of a gas flow control system in which the present invention may be embodied;

FIG. 2 is a top plan view of a diaphragm incorporating one embodiment of the present invention;

FIG. 3 is a cross-section of the embodiment of the present invention shown in FIG. 2 taken along line 3—3 of FIG. 2;

FIG. 4 is a top plan view of a diaphragm incorporating a second embodiment of the present invention; and FIG. 5 is a cross-section of the embodiment of the present invention shown in FIG. 4, taken along line 5—5 of FIG. 4.

DESCRIPTION OF THE PREFERRED EMBODIMENT

A pressure regulator 10 having an upper section 12, a central section 14, and a lower section 16 is illustrated in FIG. 1. Section 12 includes a bleed pressure regulator 18 and an actuator 20 in the form of an on-off and/or a modulating control device, both of these components being of conventional design and hence being represented schematically in FIG. 1. Actuator 20, which may be a valve, is operated in response to conditions sensed by thermal bulb 22 and communicated to the actuator by capillary tubing 24. A bleed chamber 26 is situated in the interior of section 12 and a layer of gasketing material 27 is placed between sections 12 and 14 to create a fluid-tight seal.

Section 14 includes an inlet passage 28 and an outlet passage 30 that are separated by an annular valve seat 32. A flexible diaphragm 34 (of conventional design in FIG. 1) cooperates with seat 32 to control the fluid flow therethrough. Diaphragm 34 includes a raised generally circular valve face or wall 35 disposed on and forming an integral part of diaphragm 34. Circular wall 35 extends substantially transversely from the surface of diaphragm 34 toward valve seat 32 and has a diameter greater than that of valve seat 32. The periphery of valve 34 is clamped between sections 14 and 16 during the assembly of regulator 10. The central part of the diaphragm encloses an upwardly opening cavity in section 16 to create an operating chamber 36 on its underside. The central part of the diaphragm also separates chamber 36 from inlet pressure chamber 38 created within section 14 on its opposite side.

Inlet chamber 38 communicates with inlet passage 28 so that the upper surface of the diaphragm valve is subjected to inlet pressure. A backup plate or washer pan 40 is secured to the underside of diaphragm 34 by forcing the pan into the annular rib of a projection 41 depending from the center of diaphgram 34. A coil spring 42 is mounted in compression between the bottom wall of the cavity in section 16 and the pan whereby valve 34 is biased toward valve seat 32.

Regulator 10 has an internal bleed line arrangement including an inlet bleed passage 44 which communicates with main flow inlet passage 28 and which leads to the bleed chamber 26 having divergent bleed passages leading therefrom. A flow restrictor 46 with an small orifice therein is disposed in passage 44 to cause a pressure drop in the bleed flow. One divergent passage 48 leads from chamber 26 to operating chamber 36, and another passage (not shown) leads from chamber 26 through on-off actuator 20 and bleed pressure regulator 18 and thence through an outlet pressure sensing port to outlet passage 30 to establish communication therebetween.

The operation of a valve of the type illustrated by regulator 10 is well known in the art, being described in detail, for example, in U.S. Pat. NO. 3,468,511. The open position of main valve 34 of regulator 10 is shown in FIG. 1 wherein the valve is moved downwardly away from seat 32 under normal, relatively high flow rate conditions.

One of the embodiments of the present invention is illustrated in FIGS. 2 and 3. In this embodiment four baffles or vanes 50, 52, 54 and 56 are mounted on circular wall 35 which is fixedly mounted on diaphragm 34. Baffles 50, 52, 54 and 56 extend radially from the centerpoint of circular wall 35 and diaphragm 34, which corresponds normally to the centerpoint of valve seat 32. Baffles 50, 52, 54 and 56 are spaced approximately 90 degrss apart and extend radially outwardly from the centerpoint a distance less than the radius of valve seat 32. Thus when diaphragm 34 is in a closed position baffles 50, 52, 54 and 56 will be disposed within the interior of valve seat 32 which engages circular wall 35. The baffles 50, 52, 54 and 56 are each tapered slightly outwardly from top to bottom on their outer edges.

The preferred embodiment of the present invention is illustrated in FIGS. 4 and 5. In this embodiment baffles or vanes 60, 62, 64 and 66 are fixedly connected to a hollow frusto-conical member 70, all of which elements are fixedly mounted on circular wall 35 which in turn is mounted on diaphragm 34. Conical member 70 is mounted approximately at the centerpoint of circular wall 35 and diaphragm 34, which corresponds normally to the centerpoint of valve seat 32. Thus, the longitudinal axis of conical member 70 is generally perpendicular to the plane of diaphragm 34 and intersects the centerpoint of diaphragm 34. Baffles 60, 62, 64 and 66 are spaced approximately 90° apart and extend radially outwardly from the centerpoint of conical member 70. The outer ends of baffles 60, 62, 64 and 66 extend from the centerpoint of conical member 70 a distance less than the radius of valve seat 32. Thus, when diaphragm valve 34 is in its closed position, conical member 70 and baffles 60, 62, 64 and 66 connected thereto are disposed within the interior of valve seat 32 which engages circular wall 35. The baffles 60, 62, 64 and 66 are tapered slightly outwardly from top to bottom. Diaphragm 34 also includes in this embodiment an annular tab 72 which provides a sealing means for bleed gas ported to the underside of the diaphragm 34, as is conventional in this type of pressure regulator.

A cylindrical interior cavity 74 of conical body member 70 extends from the top of conical member 70 down to a point corresponding generally to the bottom of circular wall 35 and the top of projection 41. In this particular embodiment of the present invention, projection 41 is provided with a cylindrical interior cavity 76, as is best illustrated in FIG. 5. Cavity 76 is of lesser diameter than cavity 74 and is axially aligned therewith and with the longitudinal axis of conical member 70.

It has been found that the several baffles, or plurality of baffles, provided in accordance with the present invention significantly increase the fluid flow through pressure regulator 10. It is believed, without wishing to be found by theory, that these results are achieved by the action of the several baffles or vanes which reduce turbulence, swirls and eddy currents of the fluid flowing through regulator 10. These results are particularly desirable in that low main gas line pressures are required. Also the use of smaller pressure regulator and valve components are required for a given rate of fluid flow. Further, the present invention makes it possible to secure a higher capacity without enlarging the size of the control body.

Inasmuch as the present invention is subject to many modifications, variations and changes in detail, it is intended that all matter contained in the foregoing description or shown in the accompanying drawings shall be interpreted as illustrative and not in a limiting sense.

What is claimed is:

1. In a gas flow pressure regulator, the combination comprising a valve casing having inlet and outlet means and an annular valve seat therebetween, a differential pressure operated diaphragm made of flexible rubber-like material and being disposed upstream of said valve seat, said diaphragm having a peripheral portion mounted in said casing and a central portion defining a valve face cooperating with said valve seat to regulate pressure of a gas flow therethrough, a frusto-conical member integrally formed on said central portion and extending through said valve seat so as to have its free end portion disposed downstream of said valve seat, a plurality of equally spaced baffles integrally formed on said central portion and said frusto-conical member.

said baffles having free end portions terminating with the free end portion of said frusto-conical member so as to extend through said valve seat and be disposed downstream of said valve seat to reduce turbulence of the gas flow to said outlet means, and a centrally disposed cavity in said frusto-conical member being open at the free end portion thereof whereby said cavity is open downstream of said valve seat.

* * * * *